Patented Jan. 6, 1925.

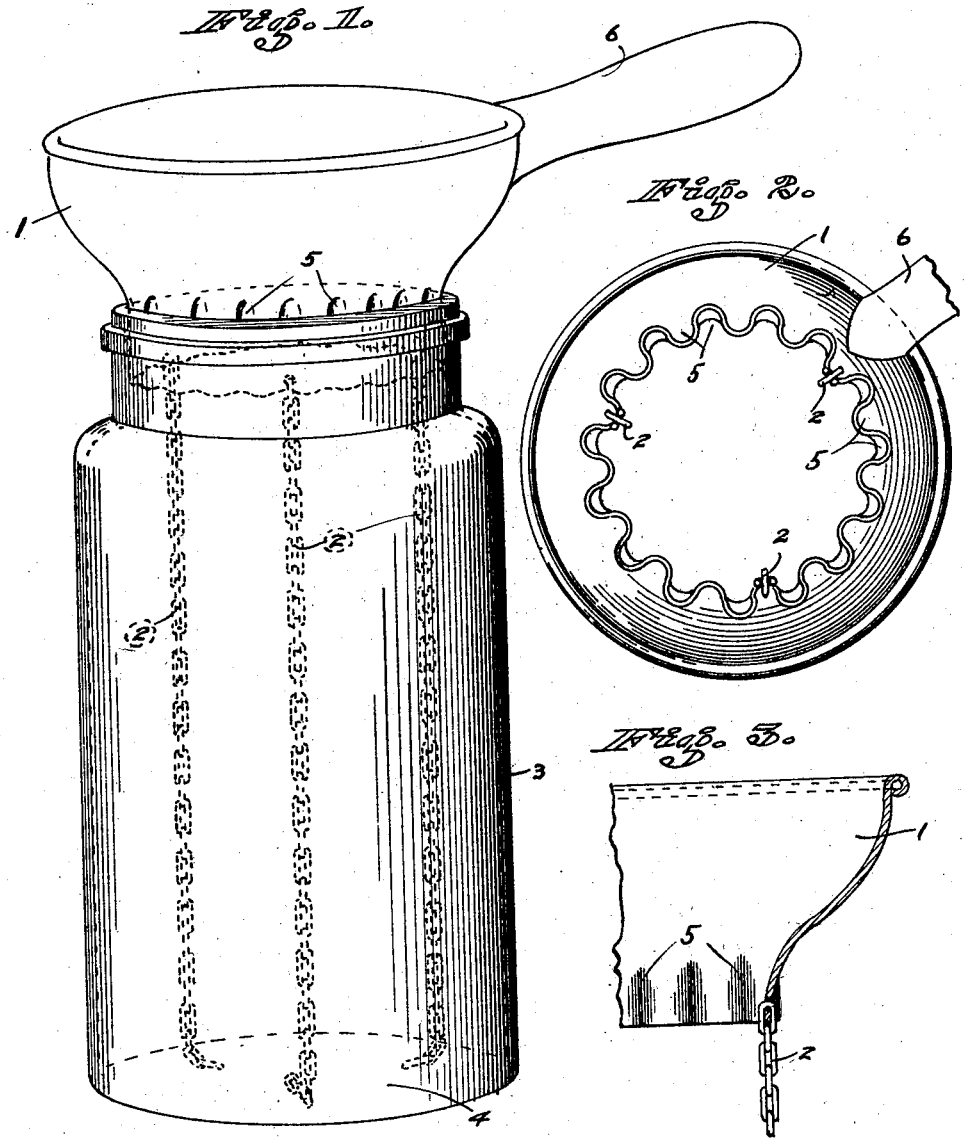

1,522,167

UNITED STATES PATENT OFFICE.

CHARLEY W. YOUNG, OF SAN JOSE, CALIFORNIA.

PROTECTING FUNNEL FOR FRUIT JARS AND THE LIKE.

Application filed March 4, 1924. Serial No. 696,824.

*To all whom it may concern:*

Be it known that I, CHARLEY W. YOUNG, a citizen of the United States, and a resident of San Jose, county of Santa Clara, and State of California, have invented a new and useful Protecting Funnel for Fruit Jars and the like, of which the following is a specification.

This invention relates to means for preventing the cracking of jars, bottles and the like upon the introduction of scalding hot liquids into such receptacles, and especially the filling of glass fruit jars with very hot fruits, syrups, et cetera, in the process of preserving.

The principal object of my invention is to provide a simple device useful in the ordinary process of canning fruit, especially as carried out in the household, and which will embody structure adapted to prevent cracking of cold jars upon pouring in scalding water or the hot fruit.

Another object is to provide auxiliary means for the escape of steam and air from the jar.

I attain the objects mentioned by a special funnel combination shown in the accompanying drawings and in which:

Figure 1 shows in perspective, a glass fruit jar with my special funnel combination in position on the upper end of the jar.

Figure 2 is a bottom view of the funnel showing the fluted lower end, and

Figure 3 is a vertical section of a portion of the funnel showing the attachment thereto of one of the chains.

By a general reference to the drawings it will be seen that my invention consists essentially of a special funnel (1) with dependent chains (2) which hang down into the jar (3) and touch the bottom (4) of the same.

The functioning of the device is substantially the same as the arrangement shown in my prior patent No. 1,387,759 in which a metal rod is used in place of the chains to convey the heat up to the funnel and prevent it from localizing on the glass bottom, but the chains are more effective since they may lie on the bottom and they are not liable to break the jar upon hasty insertion.

The funnel is tapered to fit easily within the jar opening and is fluted as shown at (5) to permit escape of air and steam and to provide depressions into which the chains (2) are hooked to the funnel as shown clearly in the sectional view Figure 3.

By hooking the chains in the depressions of the fluting they fall within the outer contour of the funnel end and cause no trouble in dropping them into a jar.

To support the funnel in pouring in the hot fruit or other liquid I provide a wooden or other non-conducting handle (6) secured to the wall of the funnel in any approved manner.

The chains are preferably made of some non-corrosive metal and while I show three strands which experience has taught me are sufficient, yet it is understood that any number of chains may be used and that they may be suspended from the funnel in any manner or from any auxiliary device or ring used in connection therewith without departing from the spirit of the invention, and any such modifications are intended to be covered in my appended claims.

I claim:

1. A funnel with a chain secured thereto and depending therefrom adapted for hanging within a receptacle upon inserting the funnel therein.

2. A funnel having a fluted spout with a strand of chain engaged at one end to the funnel in one of the flutes and with the other end free.

CHARLEY W. YOUNG.